(12) United States Patent
Takahashi

(10) Patent No.: US 7,656,270 B2
(45) Date of Patent: Feb. 2, 2010

(54) KEYLESS ENTRY DEVICE WITH PASSIVE AND ACTIVE ENTRY MODES

(75) Inventor: Jun Takahashi, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 172 days.

(21) Appl. No.: 11/173,074

(22) Filed: Jul. 1, 2005

(65) Prior Publication Data
US 2006/0006984 A1 Jan. 12, 2006

(30) Foreign Application Priority Data
Jul. 9, 2004 (JP) .............................. 2004-203383

(51) Int. Cl.
G05B 19/00 (2006.01)
(52) U.S. Cl. .................. 340/5.72; 340/5.61; 340/426.36
(58) Field of Classification Search ................ 340/5.72, 340/5.61, 426.36, 5.7, 5.6, 5.62, 5.63, 5.64, 340/5.65
See application file for complete search history.

(56) References Cited

U.S. PATENT DOCUMENTS 5,594,429 A 1/1997 Nakahara
5,841,363 A * 11/1998 Jakob et al. ................. 340/5.26
6,317,035 B1 11/2001 Berberich et al.
6,617,961 B1 * 9/2003 Janssen et al. ............... 340/5.8

FOREIGN PATENT DOCUMENTS

JP 2000-192701 7/2000
JP 2000192701 A * 7/2000
WO WO 99/23335 5/1999

* cited by examiner

Primary Examiner—Brian A Zimmerman
Assistant Examiner—Yong Hang Jiang
(74) Attorney, Agent, or Firm—Brinks Hofer Gilson & Lione

(57) ABSTRACT

A device includes a car-mounted transmitter-receiver and a portable transmitter-receiver. The car-mounted transmitter-receiver includes a first memory that stores the ID of the portable transmitter-receiver and a second memory that stores the ID of the car-mounted transmitter-receiver. The portable transmitter-receiver includes a first memory that stores the ID of the car-mounted transmitter-receiver and a second memory that stores the ID of the portable transmitter-receiver. The transmission and reception of radio signals between the car-mounted transmitter-receiver and the portable transmitter-receiver are made in one of an active entry mode and a passive entry mode, in whichever entry mode the transmitted signal contains the ID of the car-mounted transmitter-receiver and the ID of the portable transmitter-receiver, and in the active entry mode, the signal transmitted by the portable transmitter-receiver further contains an instruction signal that controls a device being controlled disposed in the car.

5 Claims, 1 Drawing Sheet

KEYLESS ENTRY DEVICE WITH PASSIVE AND ACTIVE ENTRY MODES

This application claims the benefit of priority to Japanese Patent Application No. 2004-203383 filed on Jul. 9, 2004, herein incorporated by reference.

BACKGROUND OF THE INVENTION

1. Field of the Invention

The present invention relates to a keyless entry device including a car-mounted transmitter-receiver and a portable transmitter-receiver, and in particular, it relates to a key entry device in which one portable transmitter-receiver can be used only for one car-mounted transmitter-receiver even when one portable transmitter-receiver ID is registered for two car-mounted transmitter-receivers in a car manufacturing process.

2. Description of the Related Art

Vehicles such as cars generally have locks for doors to prevent theft or intrusion and breakage when not used. Doors have been locked or unlocked by inserting a key for starting an engine into a keyhole. However, so-called active keyless entry devices have come into use for convenience in which doors are locked or unlocked by operating the switch of a portable transmitter-receiver without inserting a key into a keyhole. Furthermore, so-called passive keyless entry devices have come into use in recent years in which doors can be locked or unlocked automatically without operating the switch but with a specified portable transmitter-receiver and in position. The passive keyless entry devices are generally given the function of the active keyless entry devices, or the function of the active entry, and some devices are given an electrical identifying function for engine startup to prevent the engine from starting until identification is made between a car and a portable transmitter-receiver, thereby increasing security.

This type of passive keyless entry devices having the function of the active keyless entry devices include an active keyless entry device in which an operation switch is disposed on the portable transmitter-receiver, wherein when a user operates the operation switch of the portable transmitter-receiver, the portable transmitter-receiver generates an instruction signal corresponding to the operation mode and transmits the generated instruction signal to a car-mounted transmitter-receiver by radio, and a passive keyless entry device in which the car-mounted transmitter-receiver generates a low-frequency signal including a wakeup signal and a data signal at regular intervals, transmits the generated low-frequency signal to the portable transmitter-receiver by radio, wherein when the portable transmitter-receiver has received the low-frequency signal, the portable transmitter-receiver generates a radio-frequency signal including an instruction signal and transmits the generated radio-frequency signal by radio (for example, refer to Japanese Unexamined Patent Application Publication No. 2000-320212).

In this case, the active keyless entry devices transmit an instruction signal to the car-mounted transmitter-receiver by radio by the user operating the operation switch of the portable transmitter-receiver and as such, devices disposed in the vehicle cannot be operated unless the user etc. operates the operation switch of the portable transmitter-receiver, so that the door-locked state of the vehicle does not change to an unlock state by mistake.

On the other hand, for the passive keyless entry devices, radio signals are transmitted or received between the portable transmitter-receiver and the car-mounted transmitter-receiver without operating the operation switch of the portable transmitter-receiver to allow automatic operation of the devices disposed in the vehicle, thus having higher functionality than that of the active keyless entry devices.

In such keyless entry devices, the ID of the portable transmitter-receiver is registered in the car-mounted transmitter-receiver so as to bring the car-mounted transmitter-receivers mounted on a vehicle into correspondence with a portable transmitter-receiver used therefor. In this case, a portable transmitter-receiver in which an ID unique to the portable transmitter-receiver is written to its ROM is first prepared. In registration of the ID of the portable transmitter-receiver to the car-mounted transmitter-receiver, the car-mounted transmitter-receiver is set in a registration mode in which the ID of the portable transmitter-receiver is registered, and then a switch disposed on the portable transmitter-receiver is operated, as in the active entry mode, to transmit a signal containing the ID from the portable transmitter-receiver. When the car-mounted transmitter-receiver has received the signal, the ID of the portable transmitter-receiver contained in the signal is written to an RAM provided in the car-mounted transmitter-receiver. Then a signal containing the ID of the portable transmitter-receiver and an instruction is transmitted by switch operation to identify the ID of the portable transmitter-receiver, which is registered in the car-mounted transmitter-receiver, wherein when identification has been made, the door is locked or unlocked according to the specified instruction signal. While the registration of the ID of the portable transmitter-receiver is generally made by vehicle manufacturers during a vehicle manufacturing process, it is sometimes made by vehicle dealers or rarely by a user who bought the vehicle, for example, when the portable transmitter-receiver was lost or when an additional portable transmitter-receiver is used.

Since the registration of the ID of the portable transmitter-receiver to the car-mounted transmitter-receiver is made to specify a portable transmitter-receiver used for the car-mounted transmitter-receiver as described above, duplicate registration of the ID of one portable transmitter-receiver to two or more car-mounted transmitter-receivers is not generally intended. However, for registration of the ID by a vehicle dealer, when the car-mounted transmitter-receivers of multiple vehicles are set in a portable transmitter-receiver registration mode, the ID of one portable transmitter-receiver will be registered in the car-mounted transmitter-receivers of the multiple vehicles at the transmission by the portable transmitter-receiver.

When the ID of one portable transmitter-receiver is registered in two or more car-mounted transmitter-receivers, two or more car-mounted transmitter-receivers can be controlled in normal service condition by using one portable transmitter-receiver, or in other words, the door lock of vehicles that mount the car-mounted transmitter-receivers can freely be controlled, which is not desirable for the purpose of keyless entry devices.

With another structure in which the ID of the car-mounted transmitter-receiver is written manually to individual portable transmitter-receiver using an additional writing device, and a signal containing the IDs of the portable transmitter-receiver and the car-mounted transmitter-receiver is sent at the transmission of a request signal by a passive entry, wherein when the IDs agree with each other in the portable transmitter-receiver, an answer signal is generated to unlock the door, the ID of the car-mounted transmitter-receiver is different from that, so that no identification is made to prevent unlock. On the other hand, for active entry, the identification is made only with the ID of the portable transmitter-receiver to allow door lock, thus posing the problem of difficulty in determining whether the malfunction is caused by failure or misregistration of the ID, because many vehicle dealers do not generally know the details of identification method.

SUMMARY OF THE INVENTION

The present invention has been made in light of such technical circumstances, and has as an object the provision of a keyless entry device in which when an incorrect ID of a portable transmitter-receiver is registered in a car-mounted transmitter-receiver, door lock is not activated to allow the misregistration to be found easily, permitting proper correction of the correspondence between the car-mounted transmitter-receiver and the portable transmitter-receiver and in which determinations on the identification of ID in the passive entry mode and the active entry mode are agreed with each other to allow the misregistration to be found easily, permitting proper correction of the correspondence between the car-mounted transmitter-receiver and the portable transmitter-receiver.

In order to achieve the above object, according to an aspect of the invention, there is provided a keyless entry device including a car-mounted transmitter-receiver mounted in a vehicle and a portable transmitter-receiver. The keyless entry device has the following structure:

The car-mounted transmitter-receiver includes a signal transmitter-receiver, a controller, a first memory that stores an ID assigned to the portable transmitter-receiver, and a second memory that stores an ID assigned to the car-mounted transmitter-receiver; the portable transmitter-receiver includes a signal transmitter-receiver, a controller, a key switch, a first memory that stores the ID assigned to the car-mounted transmitter-receiver, and a second memory that stores the ID assigned to the portable transmitter-receiver; wherein the transmission and reception of radio signals between the car-mounted transmitter-receiver and the portable transmitter-receiver are made in one of an active entry mode and a passive entry mode, in whichever entry mode the transmitted signal contains the ID of the car-mounted transmitter-receiver and the ID of the portable transmitter-receiver, and in the active entry mode, the signal transmitted by the portable transmitter-receiver further contains an instruction signal corresponding to the operation of the key switch, the instruction signal including an instruction signal that controls a device being controlled disposed in the vehicle.

With the keyless entry device according to an embodiment of the invention, the transmission and reception of radio signals between the car-mounted transmitter-receiver and the portable transmitter-receiver are made in one of an active entry mode and a passive entry mode, in whichever entry mode the transmitted signal contains the ID of the car-mounted transmitter-receiver and the ID of the portable transmitter-receiver, and in the active entry mode, the signal transmitted by the portable transmitter-receiver further contains an instruction signal that controls a device being controlled disposed in the vehicle and as such, misregistration can be found immediately, offering the advantage of bringing a car-mounted transmitter-receiver into one-to-one correspondence with portable transmitter-receivers used therefor.

DESCRIPTION OF THE PREFERRED EMBODIMENTS

An embodiment of the invention will be described hereinbelow with reference to the drawings.

Figure 1:
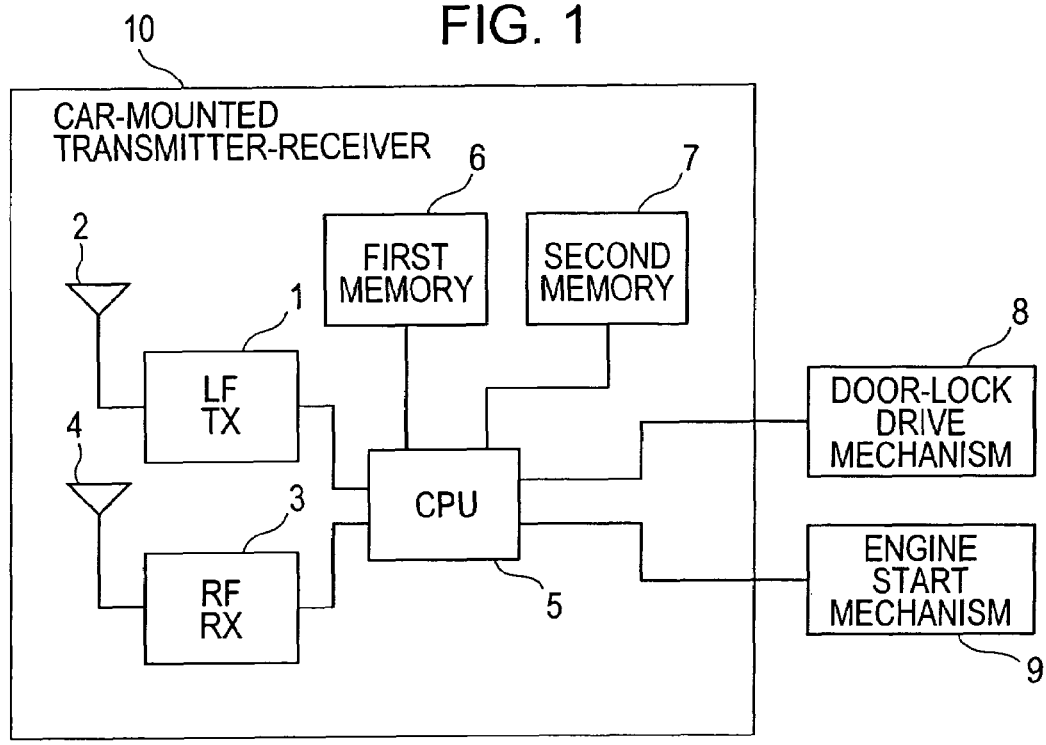
FIG. 1 is a block diagram of an example of the structure of essential parts of a car-mounted transmitter-receiver used for a keyless entry device according to an embodiment of the invention.

FIG. 1 is a block diagram of an example of the structure of essential parts of a car-mounted transmitter-receiver 10 used for a keyless entry device according to an embodiment of the invention.

As shown in FIG. 1, the car-mounted transmitter-receiver 10 according to the embodiment includes a low-frequency signal transmitter (LF TX) 1, a transmitting low-frequency antenna 2, a radio-frequency signal receiver (RF RX) 3, a receiving radio-frequency antenna 4, a controller (CPU) 5, a first memory 6, and a second memory 7. The car-mounted transmitter-receiver 10 connects to a door-lock drive mechanism 8 and an engine start mechanism 9 on the outside. In this case, the low-frequency signal transmitter 1 connects to the controller 5 at the input terminal and to the transmitting low-frequency antenna 2 at the output terminal. The radio-frequency signal receiver 3 connects to the receiving radio-frequency antenna 4 at the input terminal and to the controller 5 at the output terminal. The first memory 6 and the second memory 7 connect to the controller 5. The controller 5 connects to the door-lock drive mechanism 8 and the engine start mechanism 9. The first memory 6 stores an ID (hereinafter, referred to as a K-ID) assigned to a portable transmitter-receiver 20, to be described later. The second memory 7 stores an ID (hereinafter, referred to as a V-ID) assigned to the car-mounted transmitter-receiver 10.

Figure 2:
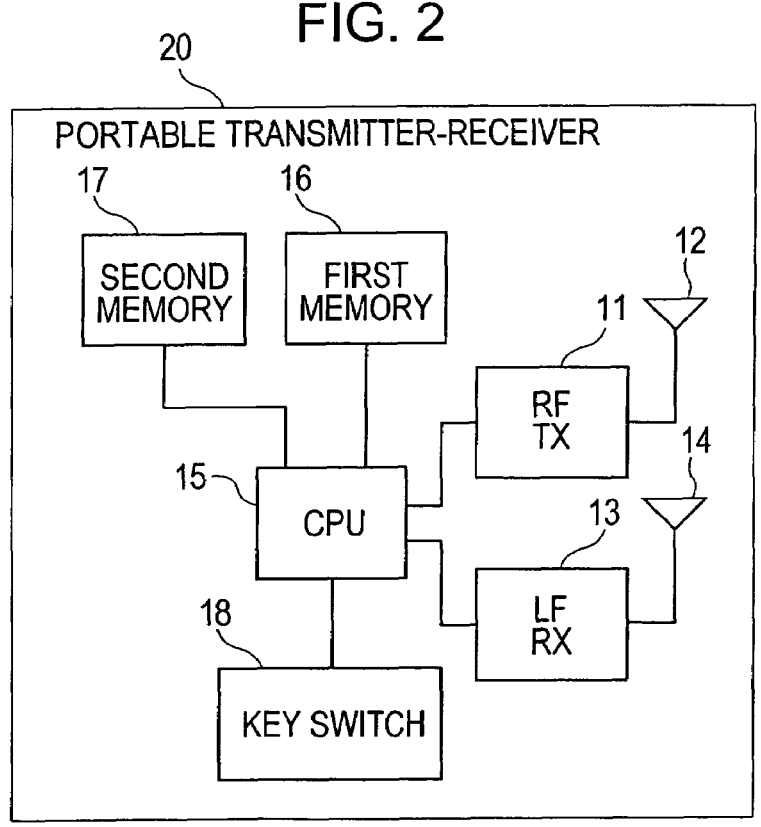
FIG. 2 is a block diagram of an example of the structure of essential parts of a portable transmitter-receiver used for the keyless entry device according to the embodiment of the invention.

FIG. 2 is a block diagram of an example of the structure of essential parts of a portable transmitter-receiver 20 used for the keyless entry device according to the embodiment of the invention.

As shown in FIG. 2, the portable transmitter-receiver 20 according to the embodiment includes a radio-frequency signal transmitter (RF TX) 11, a transmitting radio-frequency antenna 12, a low-frequency signal receiver (LF RX) 13, a receiving low-frequency antenna 14, a controller (CPU) 15, a first memory 16, a second memory 17, and a key switch 18. The radio-frequency signal transmitter 11 connects to the controller 15 at the input terminal and to the transmitting radio-frequency antenna 12 at the output terminal. The low-frequency signal receiver 13 connects to the receiving low-frequency antenna 14 at the input terminal and to the controller 15 at the output terminal. The first memory 16, the second memory 17, and the key switch 18 connect to the controller 15. The first memory 16 stores the V-ID assigned to the car-mounted transmitter-receiver 10. The second memory 17 stores the K-ID assigned to the portable transmitter-receiver 20.

The operation of the keyless entry device according to the embodiment will be described.

The keyless entry device performs a passive entry and an active entry selectively. The operations will now be described in order.

The passive entry of the keyless entry device will first be described.

At a radio signal transmission timing of the car-mounted transmitter-receiver 10, the controller 5 reads the K-ID of the portable transmitter-receiver 20 from the first memory 6 and reads the V-ID of the car-mounted transmitter-receiver 10 itself from the second memory 7, generates a low-frequency signal containing the K-ID, V-ID, and a wakeup signal, and provides the generated low-frequency signal to the low-frequency signal transmitter 1. The low-frequency signal transmitter 1 amplifies the provided low-frequency signal to a signal level suitable for transmission and then transmits it as a radio signal via the transmitting low-frequency antenna 2.

Then, the low-frequency signal receiver 13 of the portable transmitter-receiver 20 receives the radio signal sent from the car-mounted transmitter-receiver 10 via the receiving low-frequency antenna 14, then amplifies the received low-frequency signal to a specified signal level, and sends the amplified low-frequency signal to the controller 15. When the low-frequency signal is provided, the controller 15 reads the V-ID of the car-mounted transmitter-receiver 10 from the first memory 16, and the K-ID of the portable transmitter-receiver 20 from the second memory 7, respectively, extracts the K-ID of the portable transmitter-receiver 20 and the V-ID of the car-mounted transmitter-receiver 10 which are contained in the low-frequency signal, and determines whether they agree with each other. When the controller 15 determines that they agrees, it reads the V-ID of the car-mounted transmitter-receiver 10 from the first memory 16, and the K-ID of the portable transmitter-receiver 20 from the second memory 17, generates a radio-frequency signal (answer signal) containing the V-ID, K-ID, and the instruction signal, and provides the generated radio-frequency signal to the radio-frequency signal transmitter 11. Upon reception of the radio-frequency signal, the radio-frequency signal transmitter 11 amplifies the provided radio-frequency signal to a signal level suitable for transmission and then transmits it as a radio signal via the transmitting radio-frequency antenna 12. When the controller 15 determines that one or both of the IDs do not agree, it discards the provided low-frequency signal and executes no following operations.

Subsequently, the radio-frequency signal receiver 3 of the car-mounted transmitter-receiver 10 receives the radio signal sent from the portable transmitter-receiver 20 via the receiving radio-frequency antenna 4, then amplifies the received radio-frequency signal to a specified signal level, and provides the amplified radio-frequency signal to the controller 5. Upon reception of the radio-frequency signal, the controller 5 reads the K-ID of the portable transmitter-receiver 20 from the first memory 6, and the V-ID of the car-mounted transmitter-receiver 10 from the second memory 7, respectively, and extracts the K-ID of the portable transmitter-receiver 20 and the V-ID of the car-mounted transmitter-receiver 10 which are contained in the radio-frequency signal, and determines whether they agree with each other. When the controller 5 determines that they agrees, it generates a control signal that controls the condition of the vehicle-side device being controlled, for example, a control signal that changes the lock mode of the door-lock drive mechanism 8 to an unlock mode, according to the instruction signal contained in the radio-frequency signal, and provides the generated control signal to the door-lock drive mechanism 8 to set the door in an unlocked condition. Also in this case, when the controller 5 determines that one or both of the IDs do not agree, it discards the provided radio-frequency signal and executes no following operations.

The embodiment has been described for the case in which the device being controlled is the door-lock drive mechanism 8. However, the invention is applicable to the control for a so-called immobilizer that controls the engine start mechanism 9 into a startable mode when the portable transmitter-receiver 20 is determined to be present in the vehicle cabin. The device being controlled is not necessarily the two mechanisms 8 and 9, but may be other devices.

The active entry of the keyless entry device will then be described.

When a user etc. who carries the portable transmitter-receiver 20 operates the key switch 18 indicative of door lock or unlock, an instruction signal corresponding to the operation is generated from the key switch 18 and supplied to the controller 15. Upon reception of the instruction signal, the controller 15 reads the V-ID of the car-mounted transmitter-receiver 10 from the first memory 16, and the K-ID of the portable transmitter-receiver 20 from the second memory 17, respectively, and generates a radio-frequency signal containing the V-ID, K-ID, and the instruction signal and sends the generated radio-frequency signal to the radio-frequency signal transmitter 11. Upon reception of the radio-frequency signal, the radio-frequency signal transmitter 11 amplifies the radio-frequency signal to a signal level suitable for radio transmission and sends the amplified radio-frequency signal by radio via the transmitting radio-frequency antenna 12.

Then, the radio-frequency signal receiver 3 of the car-mounted transmitter-receiver 10 receives the radio signal sent from the portable transmitter-receiver 20 via the receiving radio-frequency antenna 4, then amplifies the received radio-frequency signal to a specified signal level, and provides the amplified radio-frequency signal to the controller 5. Upon reception of the radio-frequency signal, the controller 5 reads the K-ID of the portable transmitter-receiver 20 from the first memory 6, and the V-ID of the car-mounted transmitter-receiver 10 from the second memory 7, respectively, and extracts the K-ID of the portable transmitter-receiver 20 and the V-ID of the car-mounted transmitter-receiver 10 which are contained in the radio-frequency signal, and determines whether they agree with each other. When the controller 5 determines that they agrees, it generates a control signal that controls the condition of the vehicle-side device being controlled, for example, a control signal that changes the lock mode of the door-lock drive mechanism 8 to an unlock mode, according to the instruction signal contained in the radio-frequency signal, and provides the generated control signal to the door-lock drive mechanism 8 to set the door in an unlocked condition. Also in this case, when the controller 5 determines that one or both of the IDs do not agree, it discards the sent radio-frequency signal and executes no following operations.

In the keyless entry device according to this embodiment, the K-ID of the portable transmitter-receiver 20 is stored in the first memory 6 of the car-mounted transmitter-receiver 10, and the V-ID of the car-mounted transmitter-receiver 10 is stored in the second memory 7, while the V-ID of the car-mounted transmitter-receiver 10 is stored in the first memory 16 of the portable transmitter-receiver 20, and the K-ID of the portable transmitter-receiver 20 is stored in the second memory 17. Then radio signals containing the V-ID and the K-ID are transmitted or received between the car-mounted transmitter-receiver 10 and the portable transmitter-receiver 20, and moreover, the suitability of the V-ID and the K-ID is determined at the reception of the radio signals. This allows one-to-one correspondence of the portable transmitter-receiver 20 and the car-mounted transmitter-receiver 10.

The keyless entry device according to the embodiment is allowed to select the passive entry mode and the active entry mode of the car-mounted transmitter-receiver 10 and the portable transmitter-receiver 20. Accordingly, the operational function of the keyless entry device can be improved.

The operation of the registration of an ID to the keyless entry device will next be described.

A new portable transmitter-receiver 20 in which the K-ID is written to the second memory 17 (ROM) during a manufacturing process is first prepared.

A writing device (not shown) is connected to the portable transmitter-receiver 20, with which the V-ID of the car-mounted transmitter-receiver 10, which is known in advance, is inputted manually to the first memory 16 (RAM).

Then the on-off of an ignition switch is repeated and so on to bring the car-mounted transmitter-receiver 10 into a registration mode. In this case, in the second memory 7 (ROM) of the car-mounted transmitter-receiver 10 is written the V-ID written at a manufacturing process, while the first memory 6 (RAM) stores the K-IDs of the portable transmitter-receiver 20 that is used at present and a lost portable transmitter-receiver 20. When the car-mounted transmitter-receiver 10 is brought into a registration mode, the data in the first memory 6 becomes rewritable. During a fixed time in the registration mode, the key switches 18 of the present portable transmitter-receiver 20 and the new portable transmitter-receiver 20 are pushed in order to send signals from the portable transmitter-receiver 20. At that time, the car-mounted transmitter-receiver 10 writes the received K-IDs into the first memory 6 one by one, and after a lapse of a specified time, the registration mode is cancelled.

When the key switch 18 of the portable transmitter-receiver 20 is pushed with the car-mounted transmitter-receivers 10 of multiple vehicles disposed in proximity and in a registration mode, an identical K-ID is registered in the multiple car-mounted transmitter-receivers 10. In this case, the first memory 16 of the portable transmitter-receiver 20 stores only the V-ID of a specified car-mounted transmitter-receiver 10. Also, in this embodiment, a signal containing the K-ID and the V-ID is sent and identified during the passive entry mode and the active entry mode, as has been described. Thus the car-mounted transmitter-receiver 10 operates only by a specified portable transmitter-receiver 20 and, when the portable transmitter-receiver 20 is registered in the car-mounted transmitter-receiver 10 by mistake, the passive entry or the active entry is not made and as such, the misregistration can be found immediately.

According to this embodiment, to register the K-IDs of the portable transmitter-receivers 20 to the car-mounted transmitter-receiver 10, the K-IDs are written to the first memory 6 when a signal is sent from the portable transmitter-receiver 20. Alternatively, the K-IDs may be written on the premise that the V-IDs agree. However when the V-IDs do not agree, the K-IDs are not written to the first memory 6 of the car-mounted transmitter-receiver 10. The user may be notified of it.

What is claimed is:

1. A keyless entry device comprising a car-mounted transmitter-receiver mounted in a vehicle and a portable transmitter-receiver, the keyless entry device comprising:
   the car-mounted transmitter-receiver including a signal transmitter-receiver, a controller, a first memory that stores an ID assigned to the portable transmitter-receiver, and a second memory that stores an ID assigned to the car-mounted transmitter-receiver; and
   the portable transmitter-receiver including a signal transmitter-receiver, a controller, a key switch, a first memory that stores the ID assigned to the car-mounted transmitter-receiver, and a second memory that stores the ID assigned to the portable transmitter-receiver;
   wherein the transmission and reception of radio signals between the car-mounted transmitter-receiver and the portable transmitter-receiver are made in one of an active entry mode and a passive entry mode, in both entry modes the transmitted signals contain the ID of the car-mounted transmitter-receiver and the ID of the portable transmitter-receiver, and in the active entry mode, the signal transmitted by the portable transmitter-receiver further contains an instruction signal corresponding to the operation of the key switch, the instruction signal controlling a selected mechanism disposed in the vehicle; and
   wherein the ID of the portable transmitter-receiver is registered by radio in the vehicle.

2. The keyless entry device according to claim 1, wherein when a request signal is transmitted in a passive entry mode, the controller of the car-mounted transmitter-receiver makes the transmitted signal contain the ID of the car-mounted transmitter-receiver and the ID of the portable transmitter-receiver; when the request signal is a specified request signal, the controller of the portable transmitter-receiver transmits an answer signal that contains the ID of the car-mounted transmitter-receiver and the ID of the portable transmitter-receiver, wherein when the answer signal contains a specified ID, the controller of the car-mounted transmitter-receiver controls a selected device disposed in the vehicle; and
   the controller of the portable transmitter-receiver transmits a signal that contains the instruction signal, the ID of the car-mounted transmitter-receiver, and the ID of the portable transmitter-receiver in an active entry mode, wherein when the signal contains the specified ID, the controller of the car-mounted transmitter-receiver controls the selected device disposed in the vehicle.

3. The keyless entry device according to claim 2, wherein the device being controlled is a door-lock drive mechanism.

4. A keyless entry device comprising a car-mounted transmitter-receiver mounted in a vehicle and a portable transmitter-receiver, the keyless entry device comprising:
   the car-mounted transmitter-receiver including a signal transmitter-receiver, a controller, a first memory that stores an ID assigned to the portable transmitter-receiver, and a second memory that stores an ID assigned to the car-mounted transmitter-receiver; and
   the portable transmitter-receiver including a signal transmitter-receiver, a controller, a key switch, a first memory that stores the ID assigned to the car-mounted transmitter-receiver, and a second memory that stores the ID assigned to the portable transmitter-receiver;
   wherein the transmission and reception of radio signals between the car-mounted transmitter-receiver and the portable transmitter-receiver are made in one of an active entry mode and a passive entry mode, in both entry modes the transmitted signals contain the ID of the car-mounted transmitter-receiver and the ID of the portable transmitter-receiver, and in the active entry mode, the signal transmitted by the portable transmitter-receiver further contains an instruction signal corresponding to the operation of the key switch, the instruction signal controlling a selected mechanism disposed in the vehicle; and
   wherein the first memory of the car mounted transmitter-receiver stores the ID assigned to the portable transmitter-receiver only when the ID assigned to the car mounted transmitter-receiver stored in the second memory of the car-mounted transmitter-receiver agrees with the ID assigned to the car mounted transmitter-receiver stored in the first memory of the portable transmitter-receiver.

5. The keyless entry device according to claim 1 comprising:
   a writing device connected to the portable transmitter-receiver, wherein an ID assigned to the car-mounted transmitter-receiver is registered in the portable transmitter-receiver; and
   after the car-mounted transmitter-receiver is set to a registration mode, a signal containing the ID of the portable transmitter-receiver is transmitted from the portable transmitter-receiver, and the ID assigned to the portable transmitter-receiver is registered in the car-mounted transmitter-receiver.

* * * * *